United States Patent [19]

Powell

[11] Patent Number: 4,823,496

[45] Date of Patent: Apr. 25, 1989

[54] LUMINOUS FISHING ROD CLIP

[76] Inventor: Dorothy Powell, 4839 S. Vancouver, Tulsa, Okla. 74107

[21] Appl. No.: 91,499

[22] Filed: Aug. 31, 1987

[51] Int. Cl.⁴ ............................................. A01K 87/02
[52] U.S. Cl. ......................................... 43/17.5; 43/17; 43/25
[58] Field of Search ............... 43/17, 17.5, 24, 25; 116/173

[56] References Cited

U.S. PATENT DOCUMENTS

| | | |
|---|---|---|
| 2,671,209 | 3/1954 | Habib . |
| 2,770,907 | 11/1956 | Sharer . |
| 2,905,140 | 9/1959 | Akclam ............................ 116/173 |
| 3,148,473 | 9/1964 | Miller . |
| 3,624,689 | 11/1973 | Rizzo ................................... 43/17 |
| 3,740,887 | 6/1973 | Van Leeuwen ................... 43/17.5 |
| 4,505,063 | 3/1985 | Price et al. ......................... 43/17.5 |
| 4,697,375 | 10/1987 | Mills .................................. 43/17.5 |
| 4,709,500 | 12/1987 | Yasumiishi ........................... 43/17 |

Primary Examiner—Kurt Rowan
Attorney, Agent, or Firm—Young & Thompson

[57] ABSTRACT

A resilient luminous fishing rod clip having a generally U-shaped configuration including legs having confronting surfaces adapted to fit around and shape-matingly engage the outer surface of a circular end ring of a fishing rod. The clip has a circular midportion that occupies more than half a circle and that terminates in outwardly concave reverse bends which in turn terminate in outwardly convex reverse bends that are adapted shape-matingly to embrace such an end ring. Those further reverse bends terminate in further outwardly concave reverse bends that in turn terminate in free ends of the legs. The clip has a generally C-shaped cross section with concave surfaces of said C-shaped cross section adapted shape-matingly to contact such an end ring.

3 Claims, 1 Drawing Sheet

U.S. Patent  Apr. 25, 1989  4,823,496
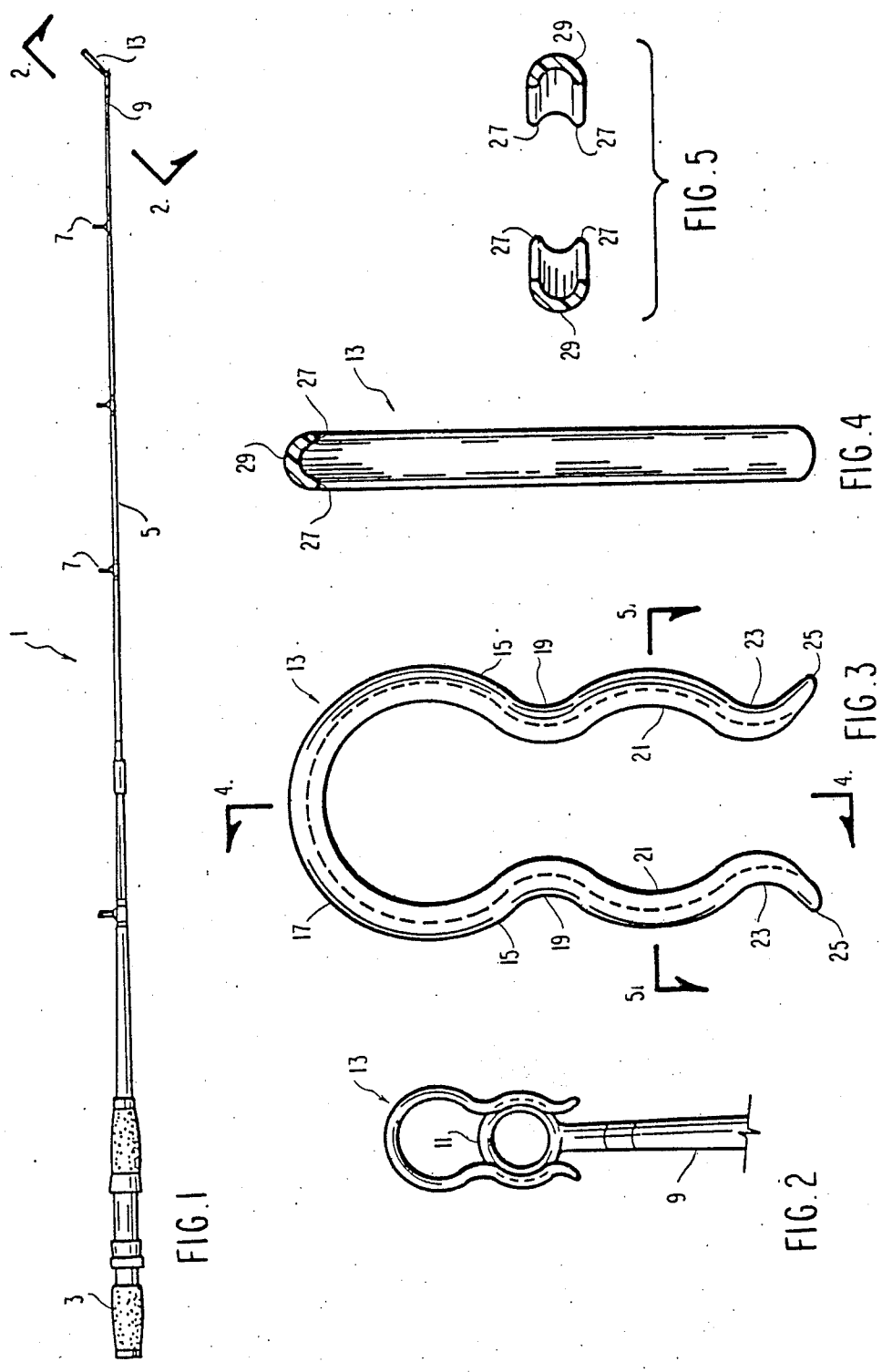

LUMINOUS FISHING ROD CLIP

The present invention relates to a luminous fishing rod clip, for use when fishing at night to detect a bite.

It has long been known to provide clip-on attachments for fishing rods for this purpose. It is also known to give the required visible signal either electrically, as in U.S. Pat. Nos. 2,196,784, 2,671,209 and 3,148,473, or luminously, as in U.S. Pat. No. 2,770,907.

However, such attachments have tended in the past to be relatively expensive. Moreover, such attachments have not been readily adaptable to mounting on the very tip of the pole. Of course, the tip of the pole is the part that deflects the farthest when a fish bites; and so a signal adaptable to the tip of the pole would have the best chance of attracting the attention of the user.

It is accordingly an object of the present invention to provide a luminous fishing rod clip, which is easily mounted on the very tip of a fishing pole.

Another object of the present invention is the provision of a luminous fishing rod clip which will be relatively inexpensive.

Finally, it is an object of the present invention to provide a luminous fishing pole clip which will be easy to manufacture and rugged and durable in use.

These and other objects and advantages of the present invention will become apparent from a consideration of the following description, taken in connection with the accompanying drawing, in which:

FIG. 1 is an elevational view of a fishing rod provided with a luminous fishing rod clip according to my invention;

FIG. 2 is an enlarged fragment of FIG. 1 viewed in the direction of the arrows 2—2 of FIG. 1;

FIG. 3 is a further enlarged elevational view of a luminous fishing rod clip according to my invention;

FIG. 4 is a cross-sectional view taken on the line 4—4 of FIG. 3; and

FIG. 5 is a further cross-sectional view taken on the line 5—5 of FIG. 3.

Referring now to the drawing in greater detail, there is shown therein a fishing rod 1 of standard construction, comprising a handle 3 and a blade 5 with guides 7 for the fishing line spaced apart along blade 5. Blade 5 terminates at a free end or tip 9 which bears a conventional end ring 11 set at an oblique angle to the axis of the fishing rod.

Detachably mountable on end ring 11 is a clip 13 according to the present invention which is coated with conventional luminous paint or is made of any luminous material or otherwise rendered luminous.

Clip 13 is of generally U-shaped configuration, having a pair of legs 15 that merge into a midportion 17, midportion 17 being part-circular and having an arcuate extent of about 270°.

It is intended that the radius of curvature of midportion 17 be about that of the end ring 11 on which clip 13 is adapted to be mounted. In this way, the legs 15 will have a generally parallel relationship when clip 13 is in place on an end ring 11.

Midportion 17 terminates at its ends in reverse bends 19. In other words, as midportion 17 was outwardly convex, so reverse bends 19 are outwardly concave and of substantially shorter radius of curvature than midportion 17. Reverse bends 19 are also of substantially less angular extent, and subtend each an angle of about 90°.

Reverse bends 19, in turn, terminate in further reverse bends 21, which, like midportion 17, are outwardly convex and have about the same radius of curvature as midportion 17, that is, a substantially greater radius of curvature than reverse bends 19. Indeed, reverse bends 21 in the undeformed condition of the clip, have a spacing which is only slightly less than that of the end ring 11 which releasably receives them. Reverse bends 21, like reverse bends 19, each subtend arcs of about 90°.

At their free ends remote from midportion 17, reverse bends 21 merge into further reverse bends 23, of outwardly concave configuration, and again an arcuate extent of about 90°. Reverse bends 23 and 19 both have about the same radius of curvature.

Reverse bends 23 in turn terminate in free ends 25 of legs 15, the free ends 25 diverging from each other.

Viewed in cross section in FIGS. 4 and 5, clip 13 is seen to have a generally C-shaped cross-sectional configuration, characterized by two legs 27 interconnected by a midportion 29. The inner contour of this cross section is generally circular and of a radius about equal to the radius of the circular cross section of end ring 11.

In use, with the clip 13 separated from end ring 11, it is necessary only to press the clip 13 onto the end ring 11 from the upper right toward the lower left as seen in FIG. 1, with the end ring 11 entering between free ends 25, whose divergence provides in effect a guide for end ring 11 between legs 15 of clip 13. The material of clip 13 is a hard resilient plastic such as acrylic butyl styrene or any other well known hard resilient plastic. Alternatively, it can be of metal, e.g. spring steel.

As end ring 11 penetrates between legs 15, it contacts, after the free ends 25, the reverse bends 23, spreading them apart a distance sufficient to let end ring 11 pass between them. The clip 13 then snaps closed when end ring 11 is centered between reverse bends 19 and 23. In this position, as indicated before, the legs 15 are only slightly spread apart from their undeformed condition, so that clip 13 is firmly but releasably held on end ring 11.

The relatively large area contact between clip 13 and end ring 11, afforded by the configuration of the present invention, in the assembled condition shown in FIG. 2, ensures that the frictional grip between 11 and 13 will be a maximum, which in turn guards against misalignment of clip 13 and its possible loss.

When it is desired to remove clip 13, it is necessary only to insert the finger or any other article into midportion 17 outside of end ring 11, and pull to the upper right as seen in FIG. 1.

From a consideration of the foregoing disclosure, therefore, it will be evident that all of the initially recited objects of the present invention have been achieved.

Although the present invention has been described in detail in connection with a preferred embodiment thereof, it will be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A resilient luminous fishing rod clip having a generally U-shaped configuration including a pair of legs having confronting surfaces adapted to fit around and shape-matingly engage the outer surface of a circular end ring of a fishing rod, said clip having a C-shaped cross section, the C-shaped cross section of each leg opening toward the C-shaped cross section of the other leg, in combination with a fishing rod having a circular end ring resiliently releasably nested between said legs in said C-shaped cross section.

2. A clip as claimed in claim 1, having a circular midportion that occupies more than half a circle and that terminates in outwardly concave reverse bends which in turn terminate in outwardly convex reverse bends that are adapted shape-matingly to embrace said end ring.

3. A clip as claimed in claim 2, in which said outwardly convex reverse bends terminate in further outwardly concave reverse bends that in turn terminate in free ends of said legs.

* * * * *